(12) United States Patent
Cariou et al.

(10) Patent No.: US 10,171,420 B2
(45) Date of Patent: Jan. 1, 2019

(54) SPATIAL REUSE FOR UPLINK MULTIUSER TRANSMISSIONS

(71) Applicant: Intel IP Corporation, Santa Clara, CA (US)

(72) Inventors: Laurent Cariou, Portland, OR (US); Po-Kai Huang, West Lafayette, IN (US)

(73) Assignee: Intel IP Corporation, Santa Clara, CA (US)

( * ) Notice: Subject to any disclaimer, the term of this patent is extended or adjusted under 35 U.S.C. 154(b) by 57 days.

(21) Appl. No.: 15/387,953

(22) Filed: Dec. 22, 2016

(65) Prior Publication Data

US 2017/0188368 A1    Jun. 29, 2017

Related U.S. Application Data

(60) Provisional application No. 62/387,271, filed on Dec. 23, 2015, provisional application No. 62/277,229, filed on Jan. 11, 2016.

(51) Int. Cl.
*H04L 29/12* (2006.01)
*H04L 29/08* (2006.01)

(52) U.S. Cl.
CPC ........ *H04L 61/6022* (2013.01); *H04L 69/323* (2013.01)

(58) Field of Classification Search
CPC .......... H04W 72/0473; H04L 61/6022; H04L 69/323
See application file for complete search history.

(56) References Cited

U.S. PATENT DOCUMENTS

| | | | |
|---|---|---|---|
| 2017/0006661 A1* | 1/2017 | Huang | H04W 84/12 |
| 2017/0070962 A1* | 3/2017 | Wang | H04W 52/241 |
| 2017/0126384 A1* | 5/2017 | Noh | H04L 5/0055 |
| 2017/0188368 A1* | 6/2017 | Cariou | H04W 72/0473 |

* cited by examiner

*Primary Examiner* — Afshawn M Towfighi
(74) *Attorney, Agent, or Firm* — Schwegman Lundberg & Woessner, P.A.

(57) ABSTRACT

Methods, apparatuses, computer readable media for spatial reuse for uplink multi-user transmissions. An apparatus of a station comprising processing circuitry is disclosed. The processing circuitry may be configured to decode a first portion of a physical layer convergence procedure (PLCP) protocol data unit (PPDU), and configure the station to transmit a frame, if the PPDU is an overlapping basic service set (OBSS) PPDU, and a receive power of the PPDU is below an overlapping power detect level. An apparatus of an access point comprising processing circuitry is disclosed. The processing circuitry may be configured to encode a PPDU comprising a basic service set identifier of the access point, and encode the PPDU to indicate spatial reuse (SR) delay, SR restricted, or SR not permitted. The processing circuitry may be further configured to configure the access point to transmit the PPDU.

24 Claims, 11 Drawing Sheets

US 10,171,420 B2

SPATIAL REUSE FOR UPLINK MULTIUSER TRANSMISSIONS

PRIORITY CLAIM

This application claims the benefit of priority under 35 USC 119(e) to U.S. Provisional Patent Application Ser. No. 62/387,271, filed Dec. 23, 2015, and to U.S. Provisional Patent Application Ser. No. 62/277,229, filed Jan. 11, 2016, each of which is incorporated herein by reference in its entirety.

TECHNICAL FIELD

Embodiments relate to Institute of Electrical and Electronic Engineers (IEEE) 802.11. Some embodiments relate to high-efficiency (HE) wireless local-area networks (WLANs). Some embodiments relate to IEEE 802.11ax. Some embodiments relate computer readable media, methods, and apparatuses for spatial reuse (SR) for uplink (UL) multiuser (MU) transmissions.

BACKGROUND

Efficient use of the resources of a wireless local-area network (WLAN) is important to provide bandwidth and acceptable response times to the users of the WLAN. However, often there are many devices trying to share the same resources and the devices may interfere with one another. Additionally, the wireless devices may be moving and the signal quality may be changing. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
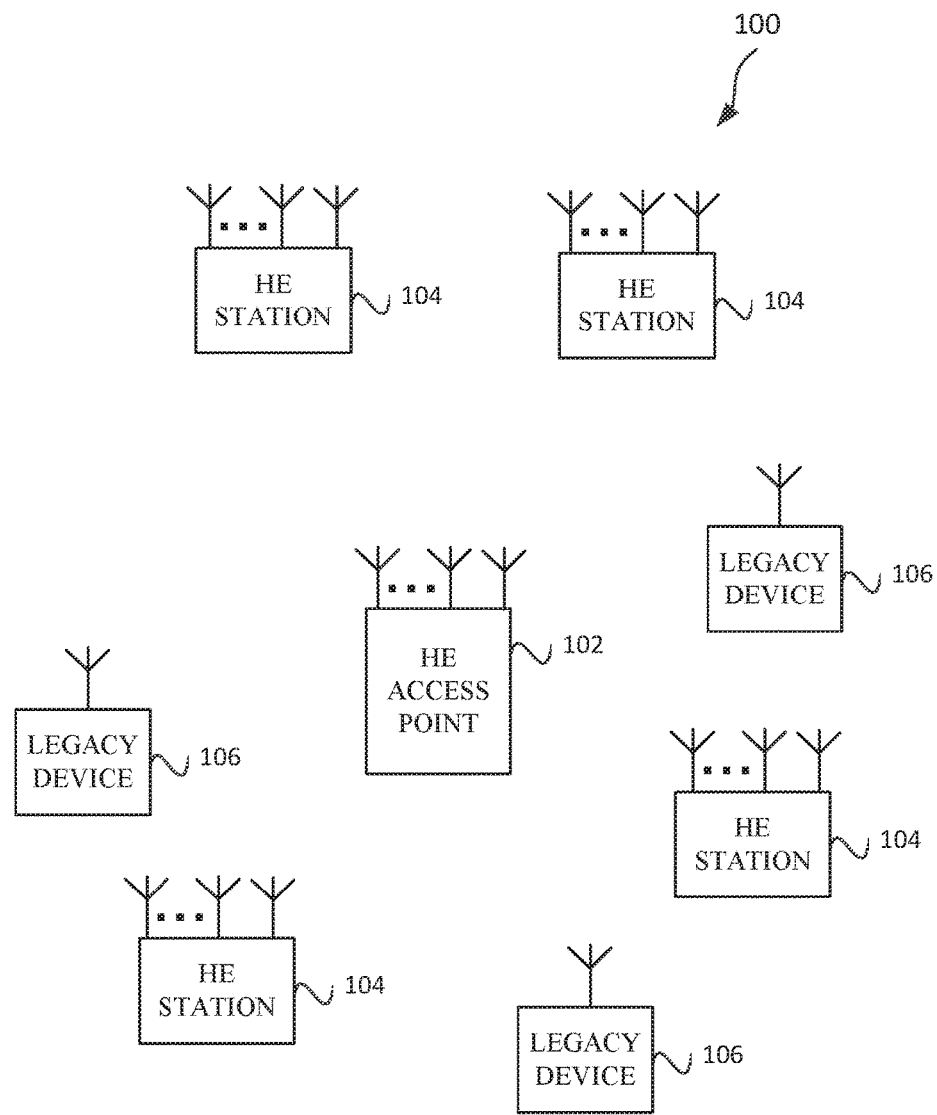
FIG. 1 illustrates a WLAN in accordance with some embodiments.

FIG. 1 illustrates a WLAN 100 in accordance with some embodiments. The WLAN 100 may comprise a basis service set (BSS) 100 that may include a HE access point 102, which may be an AP, a plurality of high-efficiency wireless (e.g., IEEE 802.11ax) (HE) stations 104, and a plurality of legacy (e.g., IEEE 802.11n/ac) devices 106.

The HE access point 102 may be an AP using the IEEE 802.11 to transmit and receive. The HE access point 102 may be a base station. The HE access point 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE access point 102 that is part of an extended service set (ESS). A controller (not illustrated) may store information that is common to the more than one HE access points 102.

The legacy devices 106 may operate in accordance with one or more of IEEE 802.11 a/b/g/n/ac/ad/af/ah/aj/ay, or another legacy wireless communication standard. The legacy devices 106 may be STAs or IEEE STAs. The HE STAs 104 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 104 may be termed high efficiency (HE) stations.

The HE access point 102 may communicate with legacy devices 106 in accordance with legacy IEEE 802.11 communication techniques. In example embodiments, the HE access point 102 may also be configured to communicate with HE STAs 104 in accordance with legacy IEEE 802.11 communication techniques.

In some embodiments, a HE frame may be configurable to have the same bandwidth as a channel. The HE frame may be a PPDU. In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE access point 102, HE STA 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a HE access point 102 may operate as a HE access point which may be arranged to contend for a wireless medium (e.g., during a contention period) to receive exclusive control of the medium for an HE control period. In some embodiments, the HE control period may be termed a transmission opportunity (TXOP). The HE access point 102 may transmit a HE master-sync transmission, which may be a trigger frame or HE control and schedule transmission, at the beginning of the HE control period. The HE access point 102 may transmit a time duration of the TXOP and sub-channel information. During the HE control period, HE STAs 104 may communicate with the HE access point 102 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE access point 102 may communicate with HE stations 104 using one or more HE frames. During the HE control period, the HE STAs 104 may operate on a sub-channel smaller than the operating range of the HE access point 102. During the HE control period, legacy stations refrain from communicating. The legacy stations may need to receive the communication from the HE access point 102 to defer from communicating.

In accordance with some embodiments, during the TXOP the HE STAs 104 may contend for the wireless medium with the legacy devices 106 being excluded from contending for the wireless medium during the master-sync transmission. In some embodiments the trigger frame may indicate an UL-MU-MIMO and/or UL OFDMA TXOP. In some embodiments, the trigger frame may include a DL-MU-MIMO and/or DL-OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE access point 102 may also communicate with legacy stations 106 and/or HE stations 104 in accordance with legacy IEEE 802.11 communication techniques. In some embodiments, the HE access point 102 may also be configurable to communicate with HE stations 104 outside the HE TXOP in accordance with legacy IEEE 802.11 communication techniques, although this is not a requirement.

In some embodiments the HE station 104 may be a "group owner" (GO) for peer-to-peer modes of operation. A wireless device may be a HE station 102 or a HE access point 102.

In some embodiments, the HE station 104 and/or HE access point 102 may be configured to operate in accordance with IEEE 802.11mc. A HE station 104 and/or HE access point 102 may be termed an HE device (e.g., station or AP), if the HE device complies with a wireless communication standard IEEE 802.11ax.

In some embodiments, the HE stations 104 may have limited power. In some embodiments, the HE stations 104 may have limited power and may transmit on an RU less than 20 MHz in order to reach the HE access point 104.

In example embodiments, the HE station 104 and/or the HE access point 102 are configured to perform the methods and functions described herein in conjunction with FIGS. 1-11.

Figure 2:
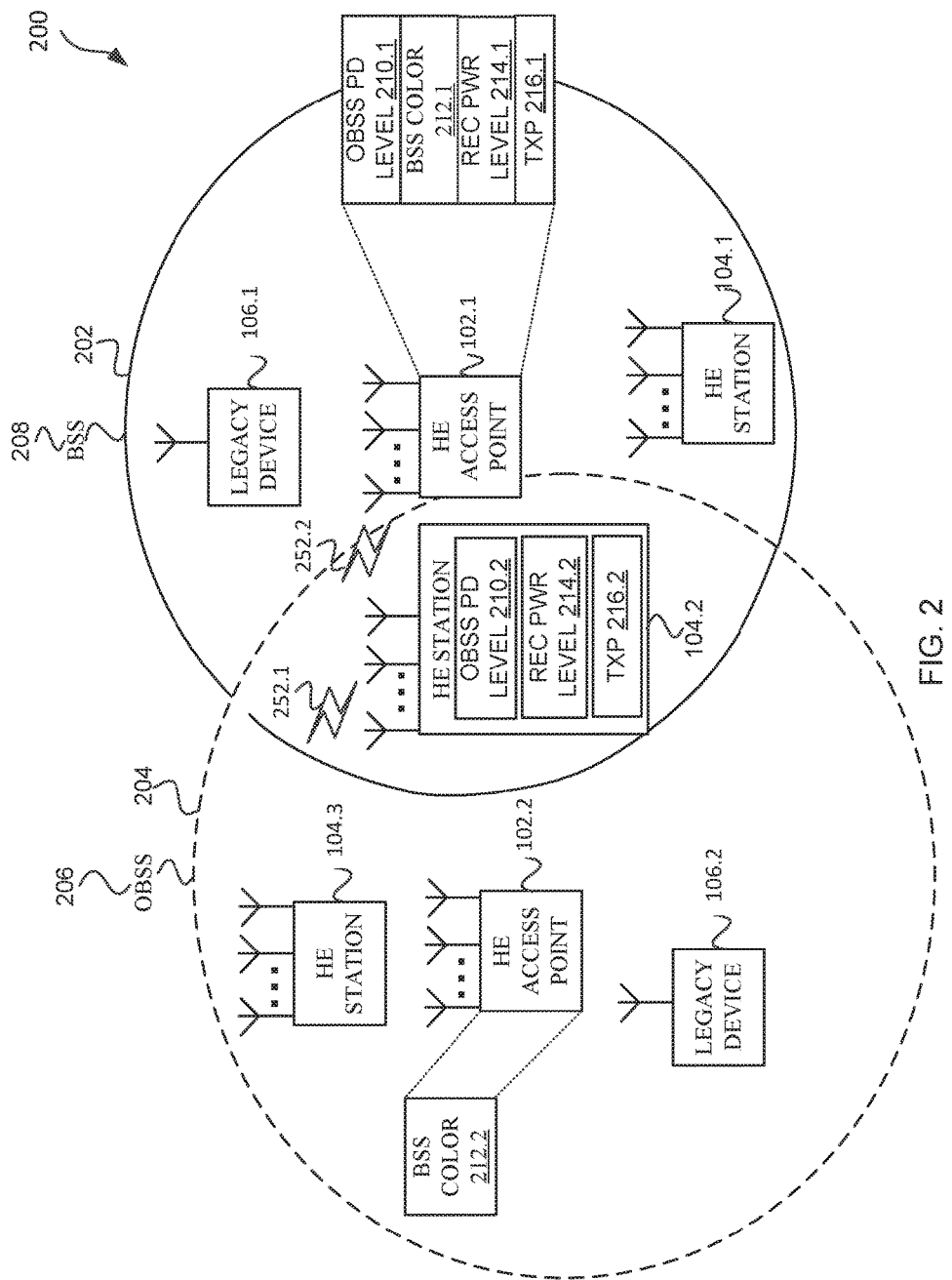
FIG. 2 illustrates an overlapping BSS (OBSS) and BSS for SR for UL MU transmissions in accordance with some embodiments.

FIG. 2 illustrates an overlapping BSS (OBSS) and BSS for SR 200 for UL MU transmissions in accordance with some embodiments. Illustrated in FIG. 2 is transmit distance 202 of BSS 208, transmit distance 204 of overlapping BSS (OBSS), OBSS 206, BSS 208, and communication 252. Transmit distance 202 and transmit distance 204 may indicate a range beyond which the signals of the HE access point 102.2 and HE access point 102.1, respectively, will be received at below a minimum received power. BSS 208 and OBSS 206 may be BSSs 100 as described in conjunction with FIG. 1. HE station 104.1 and HE station 104.2 may be associated with HE access point 102.1. HE station 104.3 may be associated with HE access point 102.2. Communication 252.1 and 252.2 may be from HE access point 102.2, HE station 104.3, or legacy device 106.2.

In some embodiments, OBSS 206 and BSS 208 may have different BSS colors 212. HE access point 102 and/or HE stations 104 may store BSS color 212.2, in accordance with some embodiments. The OBSS 206 and BSS 208 may have an BSSID (not illustrated), e.g., the BSSID for OBSS 206 may be a media access control (MAC) address (e.g., 320 of FIG. 3) of the HE access point 102.2, and BSSID of BSS 208 may be a MAC address of HE access point 102.1. The BSS color 212 and/or BSSID may be included in communications 252.

The communications 252 may each be a PPDU, e.g., HE extended range (ER) single user (SU) PPDU, HE SU PPDU, HE trigger-based PPDU, or HE MU PPDU.

HE access point 102 and HE stations 104 may determine whether communications 252 is from an OBSS 206 HE access point 102 or HE station 104, or from a BSS 208 HE access point 102 or HE station 104 based on a preamble 302 and/or MAC 304 portion of the communication 252, e.g., based on a BSSID, MAC address, or color.

The HE stations 104 and/or HE access points 102 may determine whether or not a SR opportunity exists in relation to the communication 252 based on one or more of a received energy level, a received PHY header of a frame (e.g., communication 252), a SR restriction 328 field, TF indication 326 field, channel sense (CS) required 330 field, and/or SR delay entry 332.

HE access points 102 and/or HE stations 104 may have one or more of an OBSS PD levels 210, a received power level 214, a transmit power (TXP) 216, and a BSS color 212. The OBSS power detect (PD) levels 210 may be a minimum PD level for OBSS PPDUs. The receive power level 214 may be a power level (e.g., (e.g., receive signal strength indication, RSSI) of a received frame, e.g., communication 252. The TXP 216 may be a power that is to be used to transmit a frame.

In some embodiments, OBSS frames with a PD level below 210 (or in some embodiments the same as) may be ignored. The OBSS PD level 210 is greater than a minimum receive sensitivity level of the HE access points 102 and HE stations 104, in accordance with some embodiments. In some embodiments, the OBSS PD level 210 may vary depending on a transmit power (TXP) used by the HE station 104 and/or HE access point 102.

HE access point 102 and HE stations 104 are configured to determine whether a detected PPDU of communication 252 is an inter-BSS (from OBSS 206) or an intra-BSS (from BSS 208) PPDU by using a BSS color 324 (see FIG. 3) or a MAC address 314 of the PPDU. For example, HE station 104.2 may determine that a communication 252.1 is from an OBSS because the value of the BSS color 324 field is not equal to the value of the BSS color 212.1 field, e.g., the BSS color 324 may be a BSS color 212.2.

In some embodiments, HE access points 102 and HE stations 104 are configured to regard an inter-BSS PPDU (e.g., communication 252) with a valid physical (PHY) (e.g., legacy portion 306) that has a receive power (e.g., RSSI) below the OBSS PD level 210 as not having been received at all (e.g., no update of a network allocation vector (NAV) of the HE access point 102 and HE station 104), but HE access point 102 and HE station 104 regard the wireless medium as busy during a period of time that is taken by the receiving HE access point 102 or HE station 104 to validate that the inter-BSS PPDU is from an inter-BSS, but not longer than a time indicated as the length of the PPDU payload, e.g., HE preamble length 312. legacy length 310, and/or a MAC length (not illustrated).

In some embodiments, HE stations 104 and/or HE access points 102 may be configured to determine whether a SR exists. HE stations 104 and/or HE access points 102 may receive an OBSS communication 252 (e.g., a PPDU or frame) and determine that the OBSS communication 252 has a receive power level 214 above the OBSS PD level 210 (e.g., M dBm above OBSS PD level 210), and that a valid PHY header of the communication 252 was received. The HE stations 104 and/or HE access point 102 may determine that an SR opportunity exists if the TXP 216 is adjusted so that the TXP 216 is set lower or equal to a maximum device transmit power (MaxDeviceTXPower) minus a difference between the receive power level 214 and the OBSS PD level 210 (e.g., M in dBm) plus a predetermined margin. The HE station 104 and/or HE access point 102 may transmit using the adjusted TXP 216 if the HE station 104 and/or HE access point 102 starts transmitting a frame during the duration of the OBSS communication 252 (e.g., frame duration 338), in accordance with some embodiments. In some embodiments, the HE station 104 and/or HE access point 102 will determine whether to transmit or not based further on one or more SR parameters such as SR restriction 328, SR delay entry 332, RX IF level 334, TXP 336, CS required 415, etc. (e.g., HE station 104 may determine not to transmit during frame duration 338 if SR delay entry 332 is set.)

In some embodiments, HE stations 104 and/or HE access points 102 may be configured to receive an BSS communication 252 (e.g., PPDU or frame) with a valid PHY header with a receive power level 214 below OBSS PD level 210, and regard the OBSS communication 252 as not having been received (e.g., not update a NAV) if the HE station 104 and/or HE access point 102 adjust the TXP 216 for transmitting during the reception of the communication 252 (e.g., frame duration 338). The HE station 104 and/or HE access point 102 are configured to adjust the TXP 216 so that a PPDU to be transmitted (e.g., 300) will be received by the transmitter of the communication 252 below an interference level (e.g., RX IF level 334 or a predetermined interference level that may be part of a communication standard). In some embodiments, the HE station 104 and/or HE access point 102 are configured to determine an estimated interference level at the transmitter of the BSS communication 252 based on a transmit power of the communication 252 (e.g., TXP 336) and a receive power level 214 of the communication 252. The HE station 104 and/or HE access point 102 determines the estimated power loss based on the power loss of the communication 252. In some embodiments, HE station 104 and/or HE access point 102 limit a maximum TXP 216 by TXP 336−receive power level 214+receive interference level 334. In some embodiments, a predetermined constant may be added or subtracted to/from TXP 216.

Figure 3:
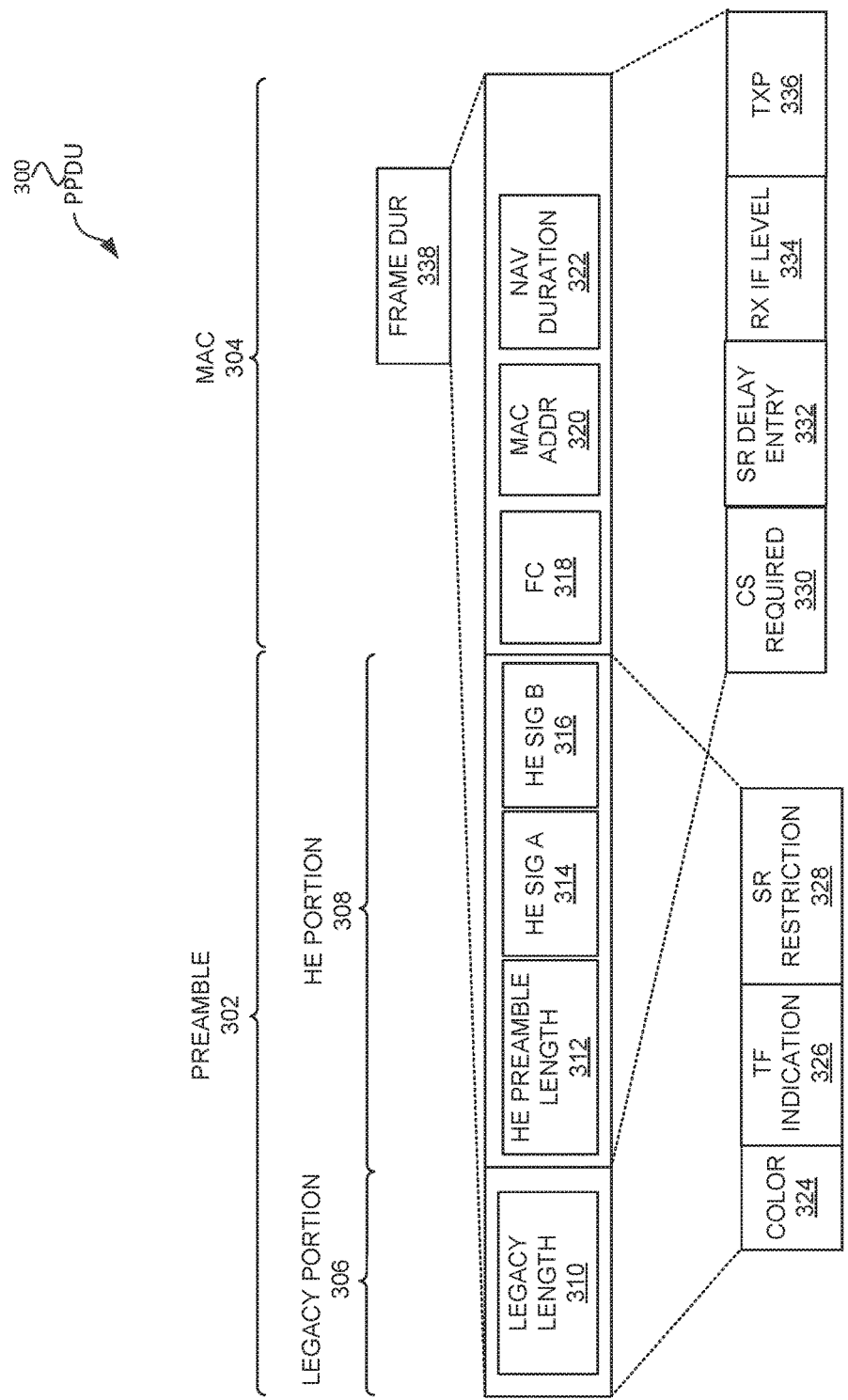
FIG. 3 illustrates a physical layer convergence procedure (PLCP) protocol data unit (PPDU)

FIG. 3 illustrates a physical layer convergence procedure (PLCP) protocol data unit (PPDU) 300. The PPDU 300 may include a preamble 302 portion and MAC 304 portion. In some embodiments, CS required 330, SR delay entry 332, receive power interference level (RX IF level) 334 field, and/or transmit power (TXP) 336 is included in the preamble 302 portion. In some embodiments, CS required 330, SR delay entry 332, receive power interference level (RX IF level) 334 field, and/or transmit power (TXP) 336 is included in the MAC 304 portion. The preamble 302 portion may include a legacy portion 306 and a HE portion 038. The legacy portion 306 may include a legacy length 310 field. A frame (PPDU) duration 338 may be part of the legacy portion 306, HE portion 308, and/or MAC 304 portion. The HE portion 308 may include one or more of a HE preamble length 312 field, HE signal (SIG) A 314 field, and/or HE SIG B 316 field. In some embodiments, the preamble 302 includes one or more of a color 324 field, TF indication 326 field, and/or SR restriction 328 field.

The preamble 302 portion and MAC 304 portion may be transmitted on different RU or bandwidths. The MAC 304 portion may include one or more of a frame control (FC) 318 field, a MAC address (ADDR) 320 field, and NAV duration 322 field. The PPDU 300 may be a HE extended range (ER) single user (SU) PPDU, HE SU PPDU, HE trigger-based PPDU, or HE MU PPDU. The legacy length 310 field may be an indication of the length of the PPDU 300 in a SIG field of the legacy portion 306, e.g., a number of symbols. The HE preamble length 312 may be an indication of the length of the PPDU 300 in a HE SIG field, e.g., HE SIG A 314 field.

The color 324 field is not included in the PPDU 300 in accordance with some embodiments. The color 324 field may be a field that indicates a color in the HE portion 308. The color 324 field may be received from an external management entity that manages BSS color 324 fields. The color 324 field may be negotiated with neighboring BSSs, e.g., using HE access point 102 to HE access point 102 communication or via a common management entity. The color 324 field may be a BSS color 324 field that indicates a color for a BSS, e.g., the HE access point 102 may determine, negotiate, or be assigned a color, and then indicate the value of the color in the color 324 field. The color 324 field may be a field in the legacy preamble 306 in accordance with some embodiments. In some embodiments, the color 324 field may be in a very-high throughput (VHT) portion of the preamble 302. In some embodiments, the color 324 field may be in a HE portion 308 of a HE SU PPDU. The color 324 field may indicate the BSS color 212 (FIG. 2) that BSS 208 or OBSS 206 is using as the color.

The TF indication 326 field is not included in the PPDU 300 in accordance with some embodiments. The TF indication 326 field may be a field that indicates whether a SR restriction is indicated. In some embodiments, the TF indication 326 field may indicate whether the frame or PPDU with preamble 302 includes or is a TF. In some embodiments, the TF indication 326 is indicated as one or more values (or one or more bits) of the SR restriction 328 field. In some embodiments, the TF indication 326 may be that a HE station 104 and/or HE access point 102 is configured to determine that a PPDU includes a TF based on a length of the frame, e.g., legacy length 310, HE preamble length 312, and/or a length in the MAC 304 portion.

The SR restriction 328 field is not included in the PPDU 300 in accordance with some embodiments. In some embodiments, SR restriction 328 field indicates whether there is a restriction for SR. In some embodiments, SR restriction 328 field is part of the HE portion 308, e.g., HE SIG A 314. The SR restriction 328 field may be one bit or more than one bit. In some embodiments, the SR restriction 328 is represented with some values or bits from another field, e.g., the color 324. The SR restriction 328 field may have different values that indicate different SR restrictions. In some embodiments, the SR restriction 328 field is 2 or more bits, e.g., 3 bits or 4 bits, and different values of the SR restriction 328 field are used to indicate different SR restrictions, e.g., SR delay, SR restricted, etc. In some embodiments, the SR restriction 328 field has a value that indicates an SR restricted restriction on SR use. In some embodiments, the SR restriction 328 field has a value that indicates an SR delay restriction on SR use. In some embodiments, a value of the SR restriction 328 field indicates a SR delay that indicates that a SR opportunity does not begin until after the current PPDU has finished being transmitted. In some embodiments, an additional time may be added to the PPDU transmission time such as an inter-frame space that is longer than that used for clear channel assessment (CCA). In some embodiments, a value of the SR restriction 328 field indicates a SR restriction that the SR opportunity only last as long as the current PPDU is being transmitted. In some embodiments, a value of the SR restriction 328 field indicates a SR restriction that the SR is not allowed. In some embodiments, a value of the SR restriction 328 field indicates there is no SR restriction for the SR opportunity.

The FC 318 may include information related to the PPDU 300. For example, the FC 318 may include a field that indicates the type of PPDU the PPDU 300 is, e.g., HE MU PPDU TF.

The MAC address 320 field may be a MAC address of a sender of the PPDU 300. The NAV duration 322 field may be an indication of how long a NAV should be set to defer to comply with the transmitter of the PPDU 300, e.g., a HE access point 102 may transmit the PPDU 300 and be a TXOP holder and a receiver may be a HE station 104 that is not addressed in the PPDU 300.

CS required 330 is not include in the PPDU 300 in accordance with some embodiments. CS required 330 indicates whether a HE station 104 should perform a CCA before transmitting UL PPDUs in accordance with resource allocations indicated in a TF, in accordance with some embodiments. The CS required 330 may be part of a common part of a resource allocation of a TF.

SR delay entry 332 is not included in the PPDU 300 in accordance some embodiments. The SR delay entry 332 may be included in the preamble 302 and/or the MAC 304 portion. In some embodiments, the SR delay entry 332 is included in the HE SIG A 314. In some embodiments, the SR delay entry 332 is include in the MAC 304 portion. The SR delay entry 332 may indicate that the SR should be delay until after the PPDU 300 has finished transmitting and, in some embodiments, an additional time to permit a HE station 104 to perform a CCA before transmitting a TB UL PPDU in response to a TF.

In some embodiments, a HE station 104 and/or HE access point 102 that transmits a HE SU PPDU or HE ER SU PPDU is permitted to set SR delay entry 332 (or indicate in a different way the SR delay mode for SR) only if a TF is carried in the HE SU PPDU or HE ER SU PPDU.

In some embodiments, a HE station 104 and/or HE access point 102 that transmits a HE MU PPDU is permitted to set SR restriction 328 (or indicate in a different way the SR restriction mode for SR) only if a TF is carried in the HE MU PPDU.

In some embodiments, a HE station 104 and/or HE access point 102 that may receive multiple SR restrictions in a HE PPDU, e.g., SR delay entry 332 and SR restriction 328. In some embodiments, the HE station 104 and/or the HE access point 102 may be configured to honor both or all SR restrictions indicated in a HE PPDU.

RX IF level 334 is a receive interference level that is permitted at the transmitter of the PPDU 300 for either OBSS frames and/or BSS frames, in accordance with some embodiments.

TXP 336 may be the power used to transmit the PPDU 300. Frame duration 338 may indicate a duration of the PPDU 300, e.g., legacy length 310, HE preamble length 312, and MAC duration (not illustrated). The frame duration 338 may have more than one field in the PPDU 300 and the fields may indicate different durations which may be due to different number of bits of the fields.

Figure 4:
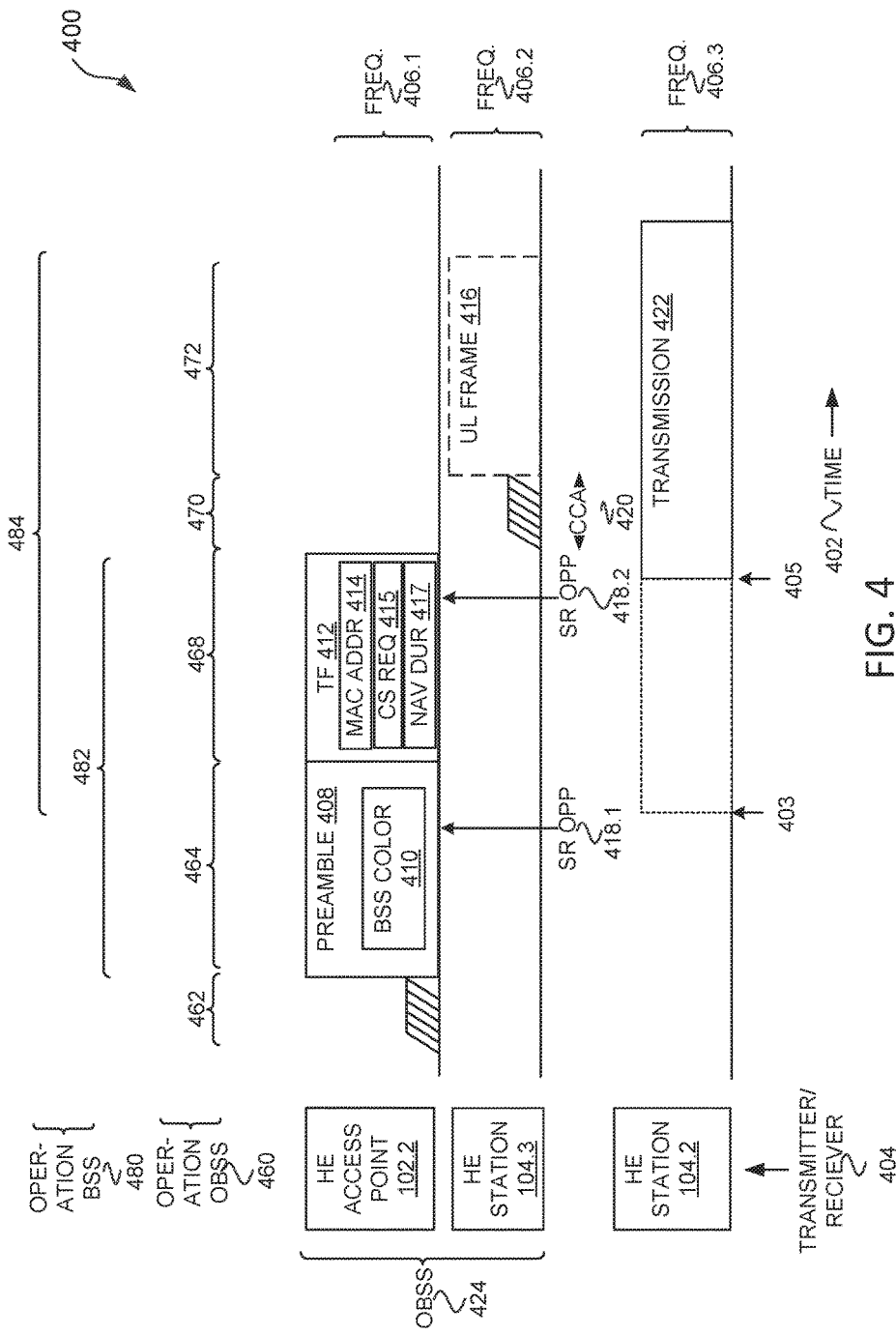
FIG. 4 illustrates a method for SR for UL MU transmissions in accordance with some embodiments.

FIG. 4 illustrates a method 400 for SR for UL MU transmissions in accordance with some embodiments. Illustrated in FIG. 4 is time 402 along a horizontal axis, transmitter/receiver 404 along a vertical axis, frequency 406 along a vertical axis, operations OBSS 480 along the top, and operations BSS 460 along the top. HE station 104.3 is associated with HE access point 102.2, e.g., see FIG. 2. HE access point 102 and HE station 104.3 are in an OBSS 424 (e.g., OBSS 206 of FIG. 2) relative to HE station 104.2, which is in a BSS, e.g., BSS 208 of FIG. 2.

The frequency 406 may be a bandwidth (e.g., an RU). The frequency 406 may overlap. For example, frequency 406.1 may be the same or overlap with frequency 406.2, e.g., TF 412 may be transmitted on a same RU as UL frame 416.

The method 400 begins with operation 462 with HE access point 102.2 contending for the wireless medium, e.g., performing a CCA. The method 400 continues at operation 464 with the HE access point 102.2 transmitting preamble 408, which may be a preamble 408 portion of TF 412, e.g., the preamble 408 may be a preamble 302 and TF 412 may be MAC 304. The preamble 408 may include a BSS color 410.

The method 400 continues with operation 482 with HE station 104.2 detecting a SR opportunity 418.1 or SR opportunity 418.2. For example, after decoding the preamble 408 a BSS color 410 may indicate a SR opportunity 418.1. The BSS color 410 and a PD level of the preamble 408 may indicate a SR opportunity 418.1 based on the BSS color 410 being different than a BSS color of HE station 104.2, e.g., BSS color 212.1 with BSS color 410 being BSS color 212.2, and the PD level being lower than an OBSS PD level 210.2.

In some embodiments, the SR opportunity 418.2 occurs later where operation 482 continues to TF 412 with HE station 104.2 decoding the MAC address 414 to determine the MAC address 414 indicates that HE access point 102.2 is an OBSS with respect to HE station 104.2 and that the PD level of the TF 412 is below an OBSS PD level 210.2.

The method 400 continues at operation 468 with the HE access point 102.2 transmitting a TF 412, which may include a MAC address 414 of the HE access point 102.2. In some embodiments, TF 412 includes a CS required 415 field, which indicates whether the HE stations 104 should perform CCA 420 before transmitting UL frame 416. In some embodiments, the TF 412 includes NAV duration (dur) 417. The HE station 104.2 may set a NAV of HE station 104.2 to NAV duration 417 if the PD level is above an OBSS PD level 210.2, in accordance with some embodiments.

The method 400 continues at operation 484 with HE station 104.2 transmitting transmission 422 if the SR opportunity 418 exists. Transmission 422 may begin at time 403 if SR opportunity 418.1 exists or at time 405 if SR opportunity 418.2 exists. The method 400 continues at operation 470 with HE station 104.3 performing a CCA 420. In some embodiments, the TF 412 includes CS required 415, which indicates whether the HE station 104.3 should perform a CCA 420 before transmitting the UL frame 416. In some embodiments, the CCA 420 will indicate that the wireless medium is busy because of PD level of transmission 422 may be above a minimum OBSS PD level or another minimum PD level. The CCA 420 may perform an energy detect or preamble detect. The duration for CCA 420 may be greater than a short inter-frame space (SIFS), e.g., point coordination function (PCF) inter-frame space (PIFS) or distributed channel access function (DCF) inter-frame space (DIFS).

In some embodiments, the trigger frame 412 is 108 bytes: 2 bytes for frame control, 2 bytes for the duration, 6 bytes for a transmission address, 2 bytes for common information, and 3 bytes*32 per-user information. In some embodiments, this may take 144 μs to transmit with a 6 MPBS transmission rate.

The method 400 continues, optionally, at operation 472 with the HE station 104.3 transmitting UL frame 416. HE station 104.2 may transmit UL frame 416 if CS required 415 field indicates that a CCA 420 does not need to be performed, in which case, operation 470 may be to wait a SIFS time. HE station 104.2 may transmit UL frame 416 if the CCA 420 indicates that transmission 422 is below an OBSS PD level 210.2 or another PD level. HE station 104.2 may not transmit UL frame 416 if the CCA 420 indicates that transmission 422 is not below OBSS PD level 210.2.

In some embodiments, the transmission 422 may cause the CCA 420 to indicate busy (e.g., PD level of transmission 422 is above a OBSS PD level), and HE station 104.3 will not transmit UL frame 416 if CCA 420 indicates busy, in accordance with some embodiments.

In some embodiments, the HE access point 102 is configured to include the BSS color 410 in the preamble 408 for each TF.

Figure 5:
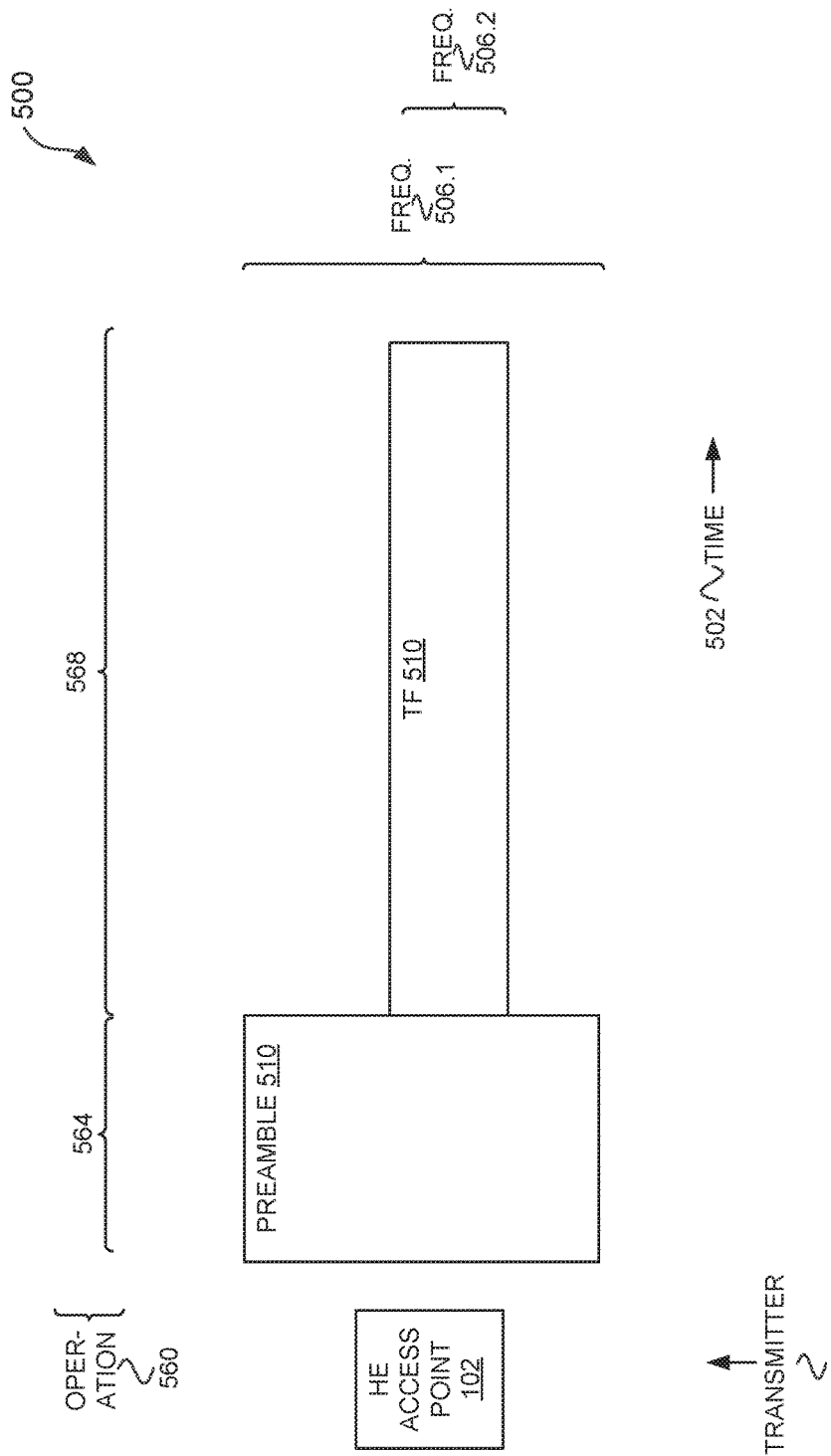
FIG. 5 illustrates a method where a trigger frame (TF) may be a broadcast TF with a longer duration than TF in accordance with some embodiments.

FIG. 5 illustrates a method 500 where a trigger frame (TF) 510 may be a broadcast TF 510 with a longer duration than TF 510 in accordance with some embodiments. Illustrated in FIG. 5 is time 502 along a horizontal axis 502, transmitter 504 along a vertical axis, frequency 506 along a vertical axis, and operations 560 along the top.

The method 500 begins at operation 564 with HE access point 102 transmitting preamble 510 on frequency 506.1. Preamble 510 may be a preamble 302 as disclosed in conjunction with FIG. 3. Frequency 506.1 may be a bandwidth such as 20 MHz, 40 MHz, 80 MHz, 160 MHz, or another bandwidth. The method 500 continues with HE access point 102 transmitting TF 510 on frequency 506.2. Frequency 506.2 may be a bandwidth less than frequency 506.1. TF 510 may be a broadcast TF. TF 510 may be MAC 304 as disclosed in conjunction with FIG. 3. TF 510 may take longer to broadcast than TF 412. In some embodiments, HE station 104.3 (FIG. 4) will have to wait longer to transmit in another TF if the TF 412 is a TF 510 and the transmission 422 blocks HE station 104.3 from transmitting by making the CCA 420 indicate busy.

Figure 6:
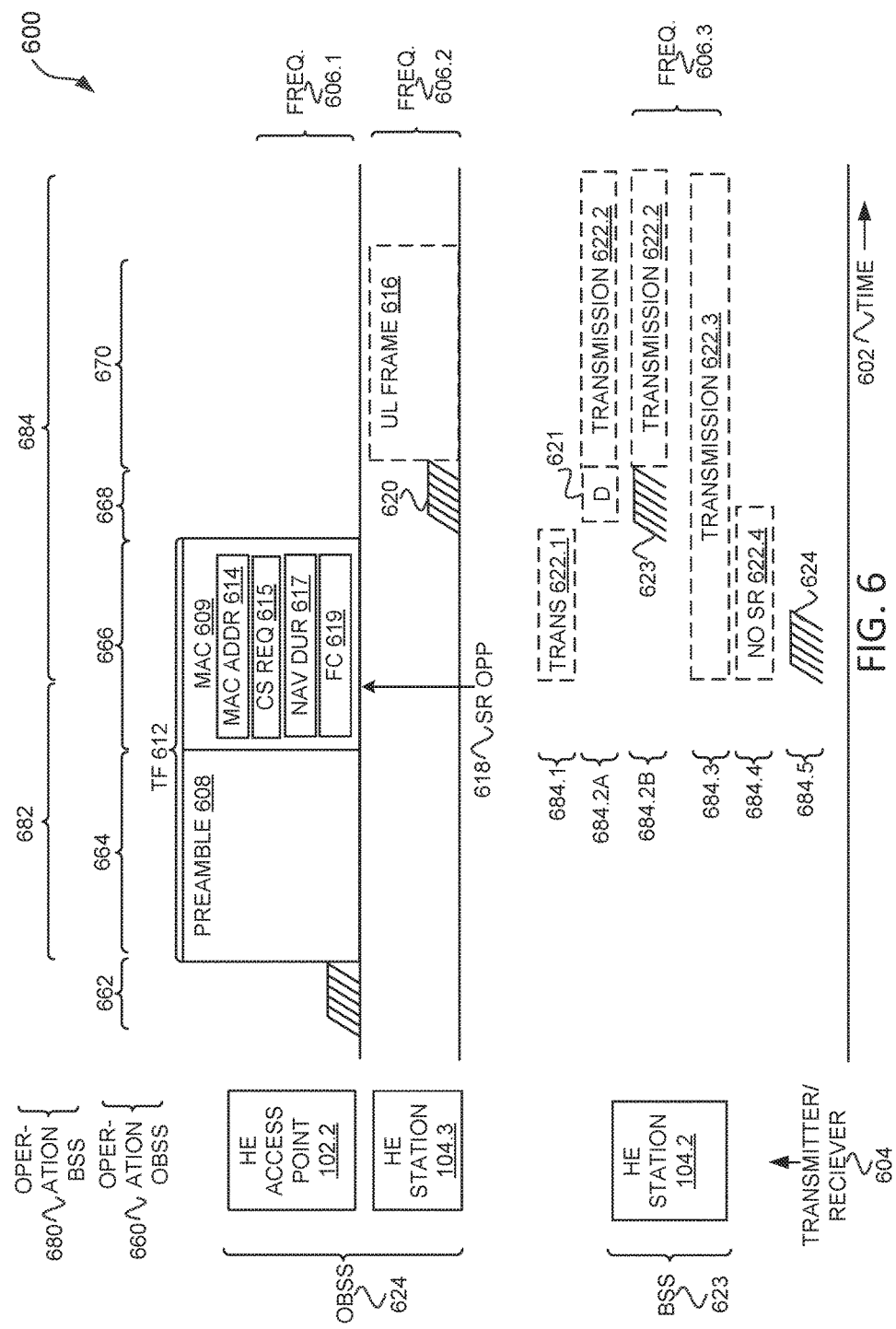
FIG. 6 illustrates a method for SR for UL MU transmissions in accordance with some embodiments.

FIG. 6 illustrates a method 600 for SR for UL MU transmissions in accordance with some embodiments. Illustrated in FIG. 6 is time 602 along a horizontal axis, transmitter/receiver 604 along a vertical axis, frequency 606 along a vertical axis, operations OBSS 680 along the top, and operations BSS 660 along the top. HE station 104.3 is associated with HE access point 102.2, e.g., see FIG. 2. HE access point 102 and HE station 104.3 are in an OBSS 624 (e.g., OBSS 206 of FIG. 2) relative to HE station 104.2, which is in a BSS 623, e.g., BSS 208 of FIG. 2.

The method 600 begins at operation 662 with the HE access point 102.2 performing CCA to gain access to the wireless medium. The method 600 continues at operation 664 with HE access point 102.2 transmitting preamble 608 of TF 612 on frequency 606.1. The preamble 608 may be a PHY header, in accordance with some embodiments. The preamble 608 may be a preamble 302 as described in conjunction with FIG. 3.

The method 600 continues at operation 666 with the HE access point 102.2 transmitting MAC 609 on frequency 606.1. In some embodiments, the MAC 609 may be transmitted on a different frequency 606, e.g., as illustrated in FIG. 5.

The MAC 609 may be a MAC 609 portion of TF 612 as described in conjunction with FIG. 3. The MAC 609 portion may include MAC address 613, CS required 615, NAV duration 617, and FC 619, as described in conjunction with FIG. 3. In some embodiments, the CS required 615 is not included in the MAC 609 portion.

The method 600 continues with operation 682 with HE station 104.2 determining that a SR opportunity 618 exists. HE station 104.2 may determine that the TF 612 is an OBSS frame based on the MAC address 614 being different than a stored MAC address of a HE access point, e.g., HE access point 102.1, that HE station 104.2 is associated with. In some embodiments, the HE station 104.2 may determine that the frame is a TF 612 based on the FC 619 as disclosed in conjunction with FIG. 3. And, HE station 104.2 may determine that an energy level of the TF 612 is below a OBSS PD level (not illustrated) stored at HE station 104.2. HE station 104.2 may then determine that a SR opportunity 618 exists.

A SR may mean that a HE station 104 and/or HE access point 102 transmits duration which the HE station 104 and/or HE access point 102 would have deferred if not for the SR, in accordance with some embodiments.

In some embodiments, the method 600 may continue at operation 684.1 with the HE station 104.2 transmitting transmission 622.1 on frequency 606.3. The transmission 622.1 may have to end by the time the TF 612 ends. In some embodiments, this may be termed SR restricted where the HE station 104.2 may only transmit in the SR opportunity 618 while the PPDU is transmitting. If the MAC 609 is a broadcast frame on a smaller bandwidth than the preamble 608 (see FIG. 5), then this may provide more time for the HE station 104.2 to transmit.

An indication that the HE station 104.2 should use SR restricted 328 may be included in the TF 612 as disclosed in conjunction with FIG. 3. The HE station 104.2 may determine how long the TF 612 is based on one or more of legacy length 310, HE preamble length 312, and/or MAC length (not illustrated), as described in conjunction with FIG. 3. In some embodiments, the SR restricted 328 is only included in HE MU PPDUs that include a TF. In some embodiments, the SR restricted 328 is included in one or more of HE MU PPDUs, SU, MU, or TB PPDUs.

In some embodiments, HE station 104.2 is configured to not update a NAV of HE station 104.2 when receiving TF 612, if TF 612 is determined to be a OBSS (inter) PPDU, a received power of the TF 612 is below a OBSS_PD level (which may vary according to a TXP used by the HE station 104.2), and the TF 612 is not one of the following: a non-HT PPDU that carries a public action frame where the receiver address field is equal to a MAC address of the HE station 104.2, or a non-HT PPDU that carries a group addressed public action frame. The HE station 104.2 may transmit while TF 612 is transmitting if the TF 612 is a HE MU PPDU and a SR restriction 328 field of TF 612 indicates a SR restricted mode of SR, or SR restriction is indicated in another way.

In some embodiments, the method 600 may continue at operation 684.2A with the HE station 104.2 waiting until after the TF 612 has transmitted and a delay period (D) 621, and then transmitting transmission 622.2 on frequency 606.3. In some embodiments, this may be termed SR delayed where the HE station 104.2 may wait to transmit until after the TF 612 has finished transmitting and HE station 104.3 has time to perform a CCA 620. In some embodiments, D 621 be a period long enough HE station 104.3 to access the wireless medium if the CCA 620 does not detect busy. In some embodiments, D 621 is a fixed duration such as an arbitration inter-frame space (AIFS) (e.g., for one of the access classes), extended inter-frame space (EIFS), distributed channel access function (DCF) inter-frame space (DIFS), point coordination function (PCF) inter-frame space (PIFS), or another predetermined duration. In some embodiments, the HE station 104.2 will determine to perform operation 684.2A based on a CS required 615 being set that indicates that HE station 104.3 will have to perform the CCA 620 before transmitting the UL frame 616. In some embodiments, operation 684.2A will only be selected by HE station 104.2 if the TF 612 is carried in a HE SU PPDU or HE ER PPDU. In some embodiments, the HE station 104.2 selects operation 684.2A if the SR opportunity 618 is identified, the CS required 615 is set (or implicitly required), and the TF 612 is carried in a HE MU PPDU. In some embodiments, the HE station 104.2 determines to select operation 684.2A based on a SR delay entry 332 as disclosed in conjunction with FIG. 3 being part of TF 612 and indicating that transmission 622.2 should be delayed. In some embodiments, D 621 is zero and the transmission 622.2 begins after TF 612.

In some embodiments, the method 600 may continue at operation 684.2B with the HE station 104.2 waiting until after the TF 612 has transmitted and performing a channel access 623 before transmitting transmission 622.2 on frequency 606.3. In some embodiments, this may be termed SR delayed where the HE station 104.2 may wait to transmit until after the TF 612 has finished transmitting. In some embodiments, the HE station 104.2 will determine to perform operation 684.2B based on a CS required 615 being set that indicates that HE station 104.3 will have to perform the CCA 620 before transmitting the UL frame 616. In some embodiments, operation 684.2B will only be selected by HE station 104.2 if the TF 612 is carried in a HE SU PPDU or HE ER PPDU. In some embodiments, the HE station 104.2 selects operation 684.2B if the SR opportunity 618 is identified, the CS required 615 is set (or implicitly required), and the TF 612 is carried in a HE MU PPDU. In some embodiments, the HE station 104.2 determines to select operation 684.2B based on a SR delay entry 332 as disclosed in conjunction with FIG. 3 being part of TF 612 and indicating that transmission 622.2 should be delayed. In some embodiments, channel access 623 may be an Enhanced distributed channel access (EDCA) procedure, PCF, or DCF procedure.

In some embodiments, operations 684.2A and/or 684.2B may add a duration of a HE PHY header of the UL frame 616 before being D 621 or channel access 623. In some embodiments of operations 684.2A and 684.2B the SR delay entry 332 is included in SU, MU, and TB PPDUs. In some embodiments, the SR delay entry 332 is only included in HE SU PPDUs and HE ER PPDUs.

In some embodiments, HE station 104.2 is configured to not update a NAV of HE station 104.2 when receiving TF 612, if TF 612 is determined to be a OBSS (inter) PPDU, a received power of the TF 612 is below a OBSS_PD level (which may vary according to a TXP used by the HE station 104.2), and the TF 612 is not one of the following: a non-HT PPDU that carries a public action frame where the receiver address field is equal to a MAC address of the HE station 104.2, or a non-HT PPDU that carries a group addressed public action frame. The HE station 104.2 may wait to transmit until after the TF 612 has finished transmitting if the TF 612 is a HE SU PPDU or HE ER SU PPDU and a SR delay entry 332 of TF 612 is set.

In some embodiments, the method 600 may continue at operation 684.3 with the HE station 104.2 transmitting transmission 622.3 on frequency 606.3, which may begin after the SR opportunity 618 is identified. The HE station 104.2 may base the duration of the transmission 622.3 on the NAV duration 617 indicated in the MAC 609 portion of the TF 612.

In some embodiments, the method 600 may continue at operation 684.4 where the HE station 104.2 determines that the HE station 104.2 may not transmit in the SR opportunity 618, which in some embodiments may be termed that there is not a SR opportunity 618. In some embodiments, the HE station 104.2 is configured to perform operation 684.4 if no SR is indicated in a HE header (e.g., HE portion 308) and the PPDU is a SU, MU, or TB PPDU.

In some embodiments, the method 600 may continue at operation 684.5 where the HE station 104.2 determines there is a SR opportunity 618 and accesses the wireless medium using an Enhanced distributed channel access (EDCA) procedure, which may include a CCA 624.

In some embodiments, the method 600 optionally continues at operation 668 with HE station 104.3 performing CCA 620 to access the medium, e.g., HE station 104.3 may perform an EDCA procedure, PCF, or DCF. HE station 104.3 may perform the CCA 620 if CS required 615 is set, in accordance with some embodiments.

The method 600 continues at operation 670 with HE station 104.3 transmitting UL frame 616 on frequency 606.2 in accordance with a resource allocation indicated in the TF 612.

In some embodiments, the HE station 104.2 may adjust the TXP 336 of the transmission 622 as disclosed in conjunction with FIG. 2, in accordance with some embodiments.

Figure 7:
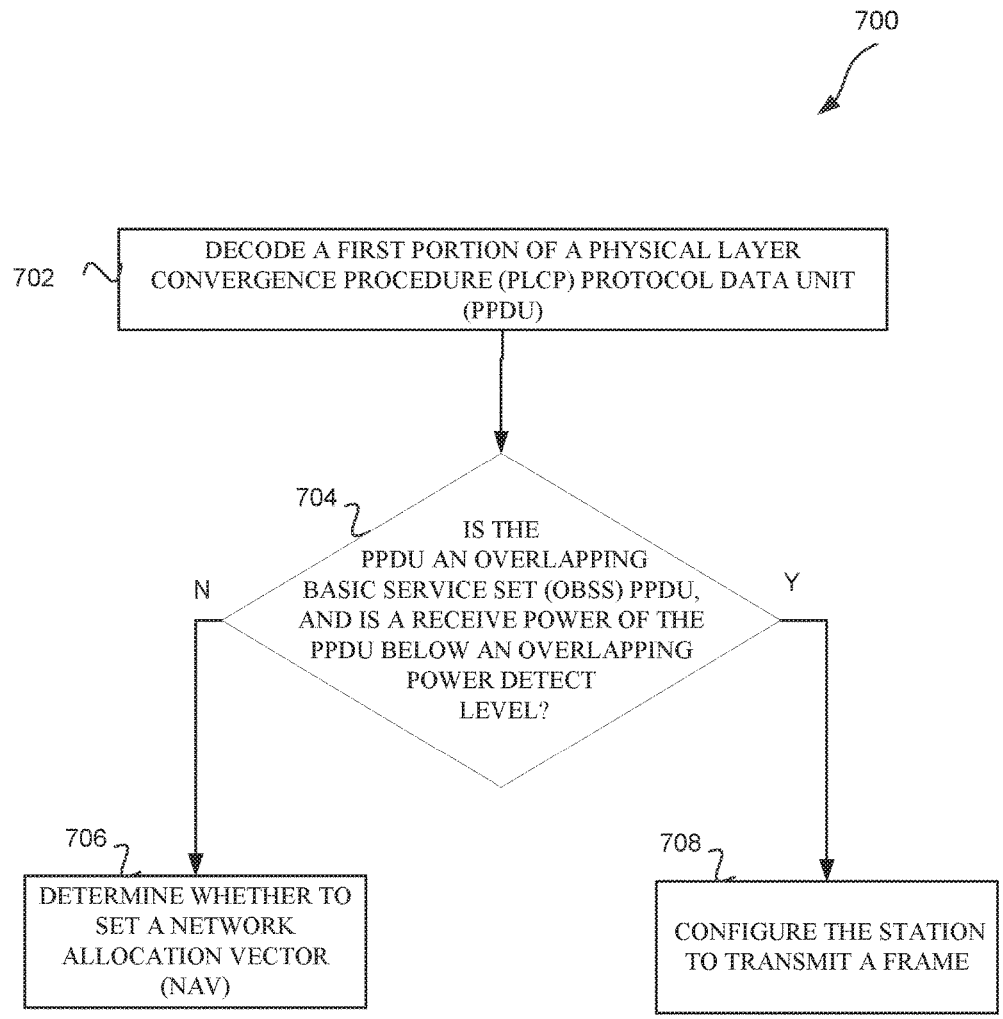
FIG. 7 illustrates a method for SR for UL MU transmissions in accordance with some embodiments.

FIG. 7 illustrates a method 700 for SR for UL MU transmissions in accordance with some embodiments. The method 700 begins at operation 702 with decoding a first portion of a PPDU. For example, HE station 104.2 may determine preamble 408 or TF 412 (FIG. 4). In another example, HE station 104.2 may decode preamble 608 or MAC 609.

The method 700 continues at operation 704 with is the PPDU is an OBSS PPDU, and is a receive power of the PPDU below an overlapping power detect level. For example, HE station 104.2 may determine whether TF 412 is an OBSS PPDU, e.g., by a color 324 or MAC address 320 of the TF 412. HE station 104.2 may further determine a receive power level of TF 412 (e.g., a legacy preamble portion) and determine whether the receive power level is less than an OBSS PD level 210.2 (FIG. 2). HE station 104.2 may determine whether TF 412 is an OBSS PPDU at time 403 or 405. As another example, HE station 104.2 may determine whether TF 612 is an OBSS PPDU, e.g., by a color 324 or MAC address 614. HE station 104.2 may further determine a receive power level of TF 612 (e.g., a legacy preamble portion) and determine whether the receive power level is less than an OBSS PD level 210.2 (FIG. 2).

The method 700 continues at operation 708 if the PPDU is an OBSS PPDU and a receive power of the PPDU is below an overlapping power detect level, with configuring the station to transmit a frame. For example, an apparatus of HE station 104.2 may configure HE station 104.2 to transmit transmission 622.1, transmission 622.2 at 684.2A or 684.2B, to transmit transmission 622.3, or to perform a CCA at 625.

The method 700 continues at operation 708 if the PPDU is not an OBSS or a receive power of the PPDU is not below an overlapping power detect level with determining whether to set a NAV. For example, HE station 104.2 at 684.4 may determine whether to set a NAV based on NAV duration 617.

The operations of method 700 may each be performed by an apparatus of a HE station 104 and/or HE access point 102.

Figure 8:
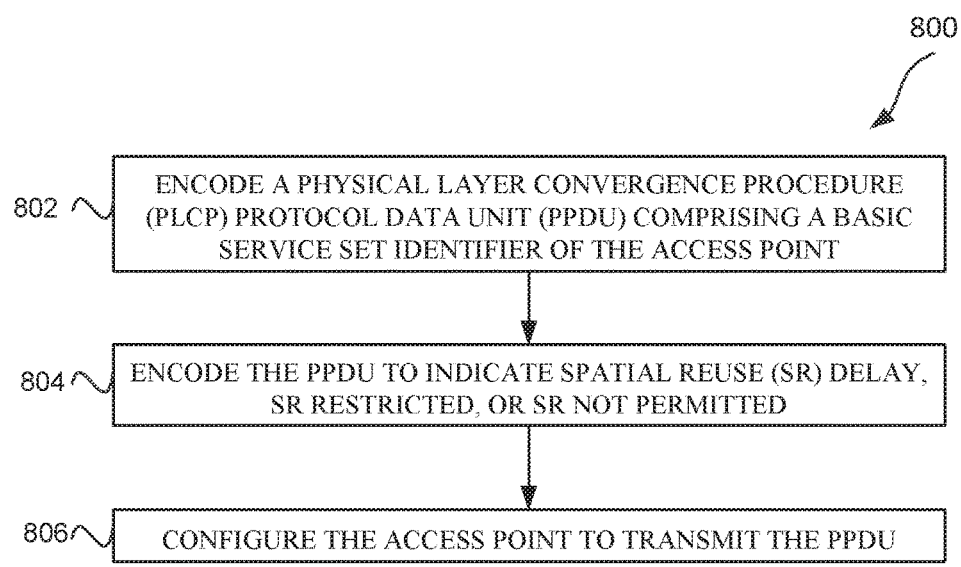
FIG. 8 illustrates a method for SR for UL MU transmissions in accordance with some embodiments.

FIG. 8 illustrates a method 800 for SR for UL MU transmissions in accordance with some embodiments. The method 800 begins at operation 802 with encoding a PPDU comprising a basic service set identifier of the access point. For example, HE access point 102.2 (FIG. 4) may encode TF 412 with a MAC address 320. In another example, HE access point 102.2 (FIG. 6) may encode TF 612 with MAC address 614.

The method 800 continues at operation 804 with encoding the PPDU to indicate spatial reuse (SR) delay, SR restricted, or SR not permitted. For example, HE access point 102.2 may encode TF 612 to include TF indication 326, SR restriction 328, or SR delay entry 332.

The method 800 continues at operation 806 with configuring the access point to transmit the PPDU. For example, an apparatus of HE access point 102.2 (FIG. 6) may configure HE access point 102.2 to transmit TF 612.

The operations of method 800 may each be performed by an apparatus of a HE station 104 and/or HE access point 102.

Figure 9:
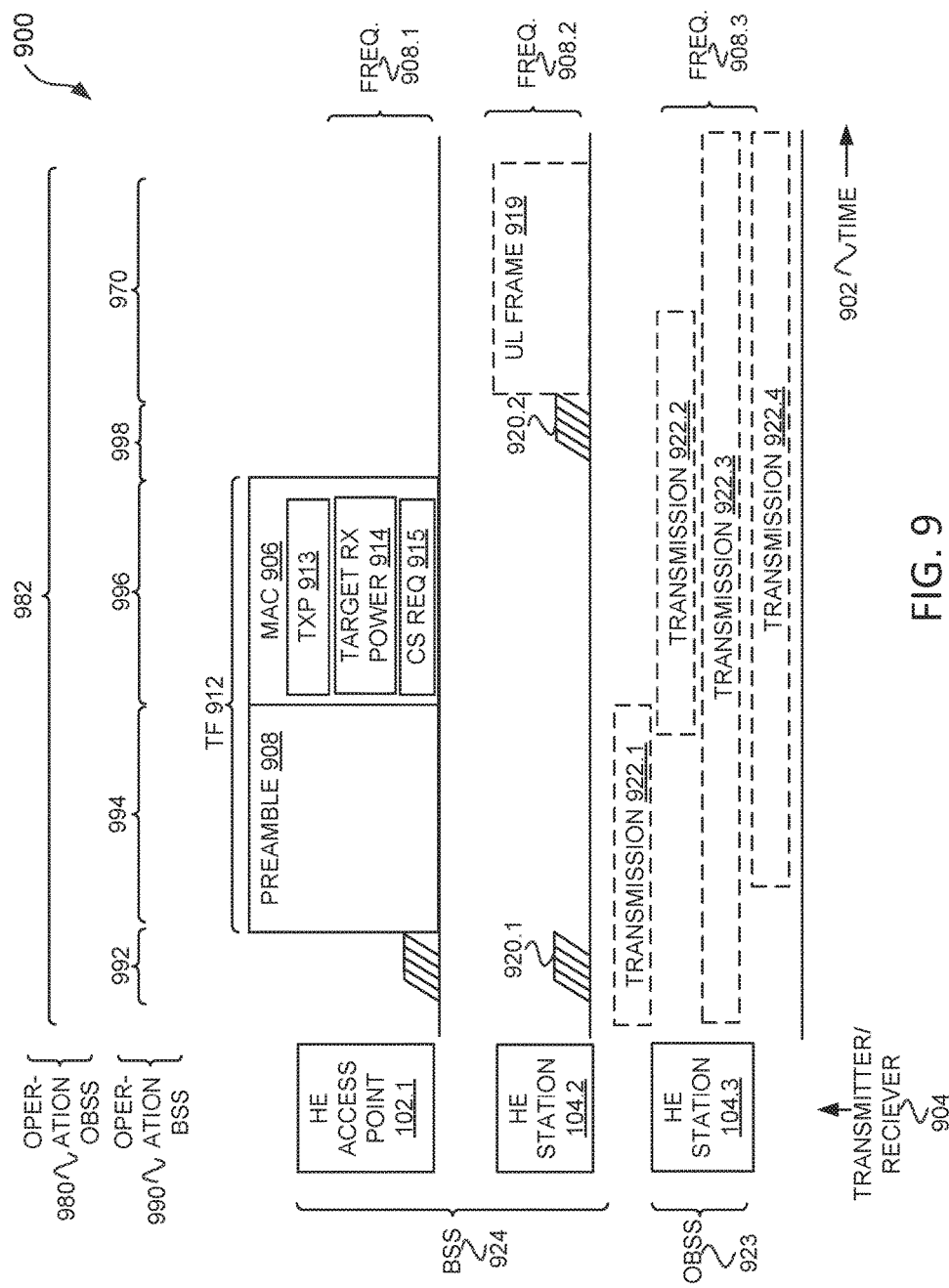
FIG. 9 illustrates a method for SR for UL MU transmissions in accordance with some embodiments.
Figure 10:
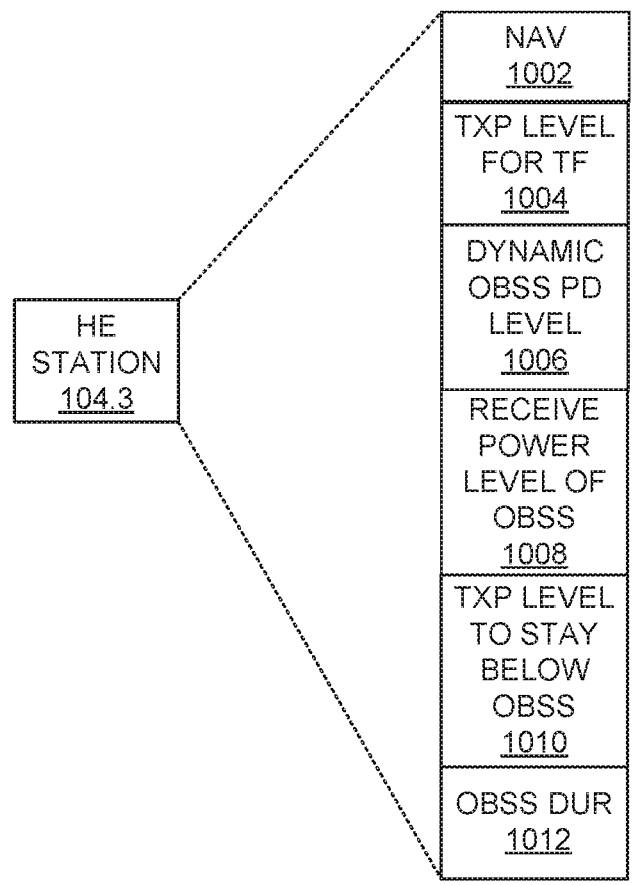
FIG. 10 illustrates HE station in accordance with some embodiments.

FIG. 9 illustrates a method 900 for SR for UL MU transmissions in accordance with some embodiments. Illustrated in FIG. 9 is time 902 along a horizontal axis, transmitter/receiver 904 along a vertical axis, frequency 906 along a vertical axis, operations OBSS 980 along the top, and operations BSS 960 along the top. HE station 104.3 is associated with HE access point 102.2, e.g., see FIG. 2. HE access point 102.1 and HE station 104.2 are in an BSS 924 (e.g., BSS 208 of FIG. 2) relative to HE station 104.3, which is in a OBSS 923, e.g., OBSS 206 of FIG. 2. FIGS. 9 and 10 will be disclosed in conjunction with one another.

TF 912 may include a preamble 908 and MAC 909. The MAC 906 may include TXP 915, target RX power 914, and CS required 915.

FIG. 10 illustrates HE station 104.2 in accordance with some embodiments. The HE station 104.2 may include one or more of NAV 1002, TXP level for TF 1004, dynamic OBSS power detect (PD) level 1006, TXP level to stay below OBSS 1010, and OBSS duration 1012.

The method 900 may begin at operation 982 with HE station 104.3 transmitting transmission 922.1, transmission 922.2, transmission 922.3, or transmission 922.4. The transmission 922 may have different start and stop times. The transmission 922 may include a frame duration 338 (FIG. 3). The transmission 922 may include one or more SR parameters, e.g., SR restriction 328 field, TF indication 326 field, SR delay entry 332 field, RX IF level 334 field, etc. The transmission 922 may be PPDU 300 as described in conjunction with FIG. 3.

The HE station 104.2 may receive the transmission 922. The HE station 104.2 may be configured to determine whether the transmission 922 is an OBSS transmission or an BSS transmission as disclosed herein. The HE station 104.2 may store a duration (e.g., frame duration 338) of the transmission 922 in a OBSS duration 1012 field. The HE station 104.2 may determine a value for a receive level of OBSS 1008 and store the value in a receive power level of the transmission 922. The HE station 104.2 may determine a TXP level to stay below OBSS 1010 based on the receive power level of OBSS 1008 and, in some embodiments, a RX IF level 334 field of transmission 922. The NAV 1002 may be updated based on the frame duration 338 if HE station 104.2 determines that a SR opportunity does not exist.

The method 900 continues at operation 992 with the HE access point 102.1 gaining access to the wireless media. The HE station 104.2 may perform a CCA at 902.1.

The method 900 continues at operation 994 with the HE access point 102.1 transmitting TF 912. The TF 912 may include a resource allocation (not illustrated) for the HE station 104.2, which provides a schedule for HE station 104.2 to transmit an UL PPDU/frame to the HE access point 102.1.

The TF 912 may indicate to the HE station 104.2 a TXP level for TF 1004. For example, the TF 912 may include a field that indicates a TXP level for TF 1004 that the HE station 104.2 is to use to transmit UL frame 919. In some embodiments, the HE station 104.2 may determine TXP level for TF 1004 based on the TXP 913 and the target RX power 914.

The HE station 104.2 can then compare the TXP level for TF 1004 (the TXP to transmit UL frame 919) with the TXP level to stay below OBSS 1010 (the TXP that HE station 104.2 needs to stay below to ignore transmission 922). If the TXP level to stay below OBSS 1010 is greater than (or equal in some embodiments) the TXP level for TF 1004, then the HE station 104.2 may continue to operation 970 and transmit the UL frame 919 using TXP level for TF 1004.

The dynamic OBSS PD level 1006 may be determined based on TXP level for TF 1004. If the TXP level to stay below OBSS 1010 is less than (or equal in some embodiments) the TXP level for TF 1004, then the HE station 104.2 may determine not to transmit the UL frame 919. In some embodiments, if the TXP level to stay below OBSS 1010 is less than (or equal in some embodiments) the TXP level for TF 1004, then the HE station 104.2 may determine to transmit the UL frame 919 using the TXP level to stay below OBSS 1010.

If the OBSS duration 1012 ends before the HE station 104.2 is scheduled to transmit (e.g., transmission 922.1), then the HE station 104.2 may continue to operation 970 and transmit using TXP level for TF 1004.

In some embodiments, if a NAV 1002 is set (e.g., by transmission 922.2), the HE station 104.2 may evaluate whether the NAV 1002 can be ignored by determining if a dynamic OBSS PD level 1006 for the TXP level for TF 1004 is greater than (or equal in some embodiments), then the receive power level of OBSS 1008 PPDU that was used to set the NAV 1002. If the NAV 1002 can be ignored, then the HE station 104.2 may continue to operation 970 with transmitting UL frame 919 using TXP level for TF 1004. In some embodiments, the HE station 104.2 may determine a greatest TXP level that permits the HE station 104.2 to ignore the NAV 1002, and transmit the UL frame 919 using that the lower of TXP level or the TXP level for TF 1004.

In some embodiments, the method 900 continues at operation 998 with the HE station 104.2 performing a CCA at 920.2. The HE station 104.2 may perform a CCA if CS required 915 is set in accordance with some embodiments. In some embodiments, the HE station 104.2 may not perform the CCA at 920.2. In some embodiments, the HE station 104.2 may transmit UL frame 919 with TXP level for TF 1004 without regard to transmission 922, if a CCA 920.1 or 920.2 was not performed during transmission 922.

In some embodiments, if CCA 920.1 was busy just before TF 912 was transmitted, and CS required 915 requires HE station 104.2 to check a CCA 920.2 PD, then the HE station 104.2 can evaluate if it cannot ignore the CCA 920.2 PD and thus not transmit UL frame 919 at operation 970. The CCA 920.2 PD can be ignored if the transmission 922 is a OBSS transmission, and the receiver power level of OBSS 1008 is lower than the dynamic OBSS PD level 1006 (which is determined based on the TXP level for TF 1004.

Figure 11:
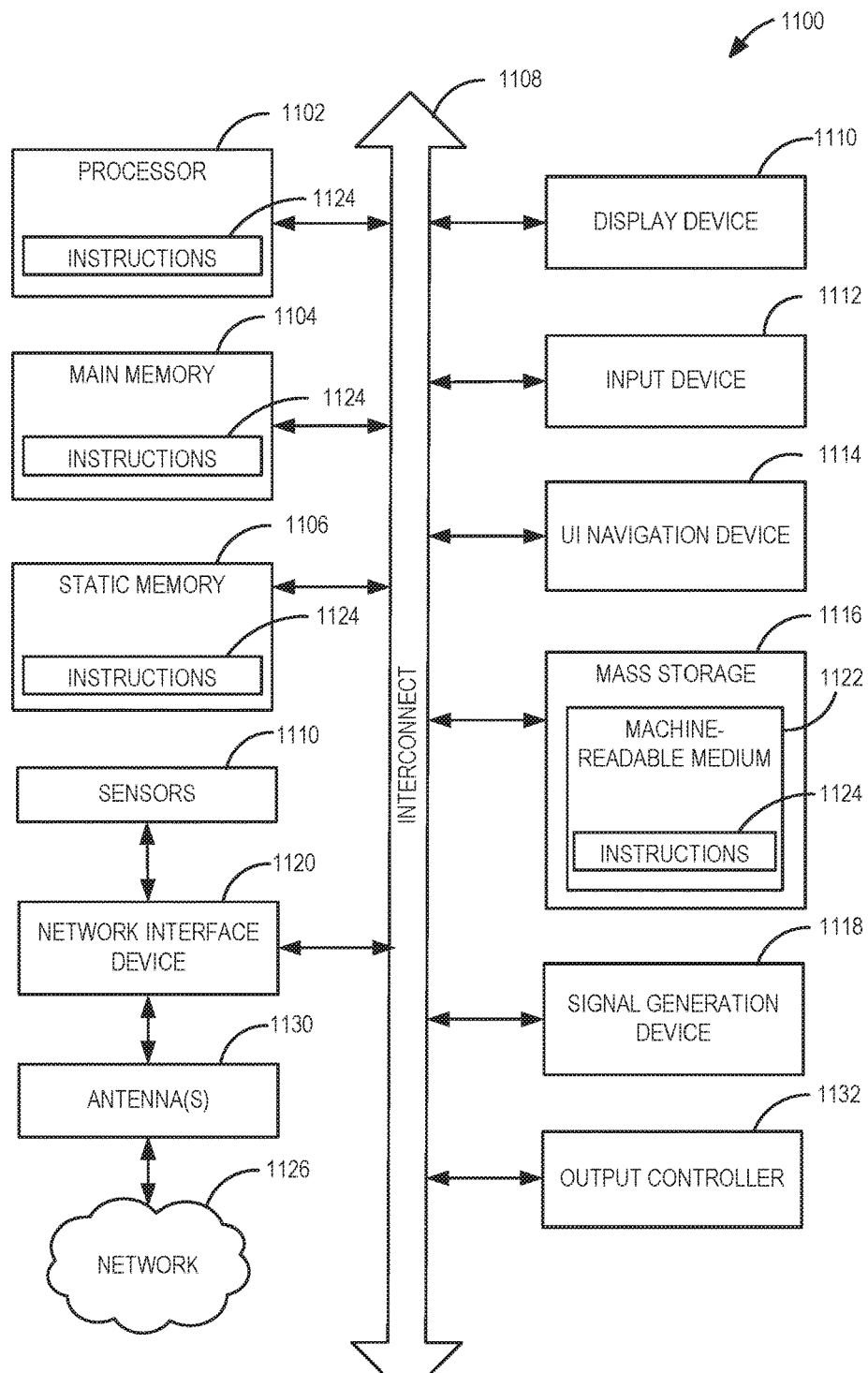
FIG. 11 illustrates a block diagram of an example machine upon which any one or more of the techniques (e.g., methodologies) discussed herein may perform.

FIG. 11 illustrates a block diagram of an example machine 1100 upon which any one or more of the techniques (e.g., methodologies) discussed herein may perform. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a HE access point 102, HE station 104, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108.

Specific examples of main memory 1104 include Random Access Memory (RAM), and semiconductor memory devices, which may include, in some embodiments, storage locations in semiconductors such as registers. Specific examples of static memory 1106 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1100 may further include a display device 1110, an input device 1112 (e.g., a keyboard), and a user interface (UI) navigation device 1114 (e.g., a mouse). In an example, the display device 1110, input device 1112 and UI navigation device 1114 may be a touch screen display. The machine 1100 may additionally include a mass storage (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1102 and/or instructions 1124 may comprise processing circuitry and/or transceiver circuitry.

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1122 is illustrated as a single medium, the term "machine readable medium" may include a single medium or multiple media (e.g., a centralized or distributed database, and/or associated caches and servers) configured to store the one or more instructions 1124.

An apparatus of the machine 1100 may be one or more of a hardware processor 1102 (e.g., a central processing unit (CPU), a graphics processing unit (GPU), a hardware processor core, or any combination thereof), a main memory 1104 and a static memory 1106, sensors 1121, network interface device 1120, antennas 1160, a display device 1110, an input device 1112, a UI navigation device 1114, a mass storage 1116, instructions 1124, a signal generation device 1118, and an output controller 1128. The apparatus may be configured to perform one or more of the methods and/or operations disclosed herein. The apparatus may be intended as a component of the machine 1100 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1120 may include one or more physical jacks (e.g., Ethernet, coaxial, or phone jacks) or one or more antennas to connect to the communications network 1126. In an example, the network interface device 1120 may include one or more antennas 1160 to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques. The term "transmission medium" shall be taken to include any intangible medium that is capable of storing, encoding or carrying instructions for execution by the machine 1100, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The following examples pertain to further embodiments. Example 1 is an apparatus of a station, the apparatus including: a memory; and processing circuitry coupled to the memory, where the processing circuitry is configured to: decode a first portion of a physical layer convergence procedure (PLCP) protocol data unit (PPDU); and if the PPDU is an overlapping basic service set (OBSS) PPDU, and a receive power of the PPDU is below an overlapping power detect level, configure the station to transmit a frame.

In Example 2, the subject matter of Example 1 optionally includes where the processing circuitry is further configured to: if the PPDU is not a non-high throughput (non-HT) frame including a public access frame with a receiver address field equal to a media access control (MAC) address of the station, if the PPDU is not a non-HT with a group address and the public access frame, if the PPDU is the OBSS PPDU, and if the receive power of the PPDU is below the overlapping power detect level, configure the station to transmit the frame.

In Example 3, the subject matter of Example 2 optionally includes where the processing circuitry is further configured to: if the PPDU is a high efficiency (HE) multi-user (MU) PPDU and a spatial reuse field of a HE signal A (HE-SIG-A) field of the PPDU indicates spatial reuse (SR) restricted, configure the station to transmit the frame during a reception of a remaining portion of the PPDU.

In Example 4, the subject matter of Example 3 optionally includes where the PPDU comprises a trigger frame.

In Example 5, the subject matter of any one or more of Examples 3-4 optionally include or more bits.

In Example 6, the subject matter of any one or more of Examples 2-5 optionally include where the processing circuitry is further configure to: if the PPDU is a high efficiency (HE) single-user (SU) PPDU or an HE extended range SU PPDU, and if a spatial reuse (SR) field of a HE signal A (HE-SIG-A) field of the PPDU indicates SR delay, configure the station to transmit the frame after receiving the PPDU.

In Example 7, the subject matter of Example 6 optionally includes or more bits.

In Example 8, the subject matter of any one or more of Examples 6-7 optionally include where the station is configured to transmit the frame after the duration of the PPDU plus a delay time, where the delay time is one from the following group: an arbitration inter-frame space (AIFS), an extended inter-frame space (EIFS), a distributed channel access function (DCF) inter-frame space (DIFS), a point coordination function (PCF) inter-frame space (PIFS), or a short inter-frame space (SIFS).

In Example 9, the subject matter of any one or more of Examples 2-8 optionally include where the processing circuitry is further configure to: if the PPDU is a high efficiency (HE) PPDU, and a spatial reuse (SR) field indicates SR disallowed, configure the station to defer before transmitting the frame for a duration of the PPDU and a network allocation vector (NAV) duration indicated by the PPDU.

In Example 10, the subject matter of any one or more of Examples 2-9 optionally include where the processing circuitry is further configure to: if the PPDU is a high efficiency (HE) PPDU, and a spatial reuse (SR) field indicates SR allowed, configure the station to begin to transmit the frame during a duration of the PPDU.

In Example 11, the subject matter of any one or more of Examples 1-10 optionally include where the processing circuitry is further configured to: if the PPDU is not a non-high throughput (non-HT) frame including a public access frame with a receiver address field equal to a media access control (MAC) address of the station, the PPDU is not a non-HT with a group address and the public access frame, the PPDU is the OBSS PPDU, and the receive power of the PPDU is below the overlapping power detect level, refrain from setting a network allocation vector (NAV) based on a NAV duration of a trigger frame, where the PPDU further comprises the trigger frame.

In Example 12, the subject matter of any one or more of Examples 1-11 optionally include where the processing circuitry is further configured to: raise the overlapping power detect level and lower a transmit power for the frame, or lower the overlapping power detect level and raise the transmit power for the frame.

In Example 13, the subject matter of any one or more of Examples 1-12 optionally include where the processing circuitry is further configured to: if the PPDU is the OBSS PPDU, and a receive power of the PPDU is below an overlapping power detect level, configure the station to transmit the frame, unless the PPDU indicates not to use spatial reuse.

In Example 14, the subject matter of any one or more of Examples 1-13 optionally include ax station.

In Example 15, the subject matter of any one or more of Examples 1-14 optionally include transceiver circuitry coupled to the memory; and, one or more antennas coupled to the transceiver circuitry.

Example 16 is a non-transitory computer-readable storage medium that stores instructions for execution by one or more processors, the instructions to configure the one or more processors to cause an apparatus of a station to: decode a first portion of a physical layer convergence procedure (PLCP) protocol data unit (PPDU); and if the PPDU is an overlapping basic service set (OBSS) PPDU, and a receive power of the PPDU is below an overlapping power detect level, configure the station to transmit a frame.

In Example 17, the subject matter of Example 16 optionally includes where the instructions further configure the one or more processors to cause the apparatus of station to: configure the station to transmit the frame, if the PPDU is not a non-high throughput (non-HT) frame including a public access frame with a receiver address field equal to a media access control (MAC) address of the station, the PPDU is not a non-HT with a group address and the public access frame, the PPDU is the OBSS PPDU, and the receive power of the PPDU is below the overlapping power detect level.

In Example 18, the subject matter of Example 17 optionally includes where the instructions further configure the one or more processors to cause the apparatus of station to: configure the station to transmit the frame within a duration of the PPDU, if the PPDU is a high efficiency (HE) multi-user (MU) PPDU and a spatial reuse field of a HE signal A (HE-SIG-A) field of the PPDU indicates spatial reuse (SR) restricted.

Example 19 is a method performed by an apparatus of a station, the method including: decoding a first portion of a physical layer convergence procedure (PLCP) protocol data unit (PPDU); and configuring the station to transmit a frame, if the PPDU is an overlapping basic service set (OBSS) PPDU, and a receive power of the PPDU is below an overlapping power detect level.

In Example 20, the subject matter of Example 19 optionally includes the method further including: configuring the station to transmit the frame, if the PPDU is not a non-high throughput (non-HT) frame including a public access frame with a receiver address field equal to a media access control (MAC) address of the station, the PPDU is not a non-HT with a group address and the public access frame, the PPDU is the OBSS PPDU, and the receive power of the PPDU is below the overlapping power detect level.

Example 21 is an apparatus of an access point including: a memory; and processing circuitry couple to the memory, where the processing circuitry is configured to: encode a physical layer convergence procedure (PLCP) protocol data unit (PPDU) including a basic service set identifier of the access point; encode the PPDU to indicate spatial reuse (SR) delay, SR restricted, or SR not permitted; and configure the access point to transmit the PPDU.

In Example 22, the subject matter of Example 21 optionally includes where the processing circuitry is configured to: if the PPDU is a high efficiency (HE) single-user (SU) PPDU or a HE extended range SU PPDU, encode the PPDU to indicate SR delay, and encode the PPDU to comprise a trigger frame.

In Example 23, the subject matter of any one or more of Examples 21-22 optionally include if the PPDU is a high efficiency (HE) multi-user (MU) PPDU, encode the PPDU to indicate SR restricted, and encode the PPDU to comprise a trigger frame.

In Example 24, the subject matter of any one or more of Examples 20-23 optionally include ax station.

In Example 25, the subject matter of any one or more of Examples 20-24 optionally include transceiver circuitry coupled to the memory; and, one or more antennas coupled to the transceiver circuitry.

Example 26 is an apparatus of a station, the apparatus including: means for decoding a first portion of a physical layer convergence procedure (PLCP) protocol data unit (PPDU); and means for configuring the station to transmit a frame, if the PPDU is an overlapping basic service set (OBSS) PPDU, and a receive power of the PPDU is below an overlapping power detect level.

In Example 27, the subject matter of Example 26 optionally includes: means for configuring the station to transmit the frame, if the PPDU is not a non-high throughput (non-HT) frame including a public access frame with a receiver address field equal to a media access control (MAC) address of the station, if the PPDU is not a non-HT with a group address and the public access frame, if the PPDU is the OBSS PPDU, and if the receive power of the PPDU is below the overlapping power detect level.

In Example 28, the subject matter of Example 27 optionally includes means for configuring the station to transmit the frame during a reception of a remaining portion of the PPDU, if the PPDU is a high efficiency (HE) multi-user (MU) PPDU and a spatial reuse field of a HE signal A (HE-SIG-A) field of the PPDU indicates spatial reuse (SR) restricted.

In Example 29, the subject matter of Example 28 optionally includes where the PPDU comprises a trigger frame.

In Example 30, the subject matter of any one or more of Examples 28-29 optionally include or more bits.

In Example 31, the subject matter of any one or more of Examples 28-30 optionally include where the processing circuitry is further configure to: means for configuring the station to transmit the frame after receiving the PPDU, if the PPDU is a high efficiency (HE) single-user (SU) PPDU or an HE extended range SU PPDU, and if a spatial reuse (SR) field of a HE signal A (HE-SIG-A) field of the PPDU indicates SR delay, configure the station to transmit the frame after receiving the PPDU.

In Example 32, the subject matter of Example 31 optionally includes or more bits.

In Example 33, the subject matter of Example 32 optionally includes where the station is configured to transmit the frame after the duration of the PPDU plus a delay time, where the delay time is one from the following group: an arbitration inter-frame space (AIFS), an extended inter-frame space (EIFS), a distributed channel access function (DCF) inter-frame space (DIFS), a point coordination function (PCF) inter-frame space (PIFS), or a short inter-frame space (SIFS).

In Example 34, the subject matter of any one or more of Examples 28-33 optionally include means for configuring the station to defer before transmitting the frame for a duration of the PPDU and a network allocation vector (NAV) duration indicated by the PPDU, if the PPDU is a high efficiency (HE) PPDU, and a spatial reuse (SR) field indicates SR disallowed.

In Example 35, the subject matter of any one or more of Examples 28-34 optionally include means for configuring the station to begin to transmit the frame during a duration of the PPDU if the PPDU is a high efficiency (HE) PPDU, and a spatial reuse (SR) field indicates SR allowed.

In Example 36, the subject matter of any one or more of Examples 27-35 optionally include where the processing circuitry is further configured to: refraining from setting a network allocation vector (NAV) based on a NAV duration of a trigger frame, if the PPDU is not a non-high throughput (non-HT) frame including a public access frame with a receiver address field equal to a media access control (MAC) address of the station, the PPDU is not a non-HT with a group address and the public access frame, the PPDU is the OBSS PPDU, and the receive power of the PPDU is below the overlapping power detect level, where the PPDU further comprises the trigger frame.

In Example 37, the subject matter of any one or more of Examples 27-36 optionally include means for raising the overlapping power detect level and lower a transmit power for the frame, or lowering the overlapping power detect level and raise the transmit power for the frame.

In Example 38, the subject matter of any one or more of Examples 27-37 optionally include means for configuring the station to transmit the frame, unless the PPDU indicates not to use spatial reuse, if the PPDU is the OBSS PPDU, and a receive power of the PPDU is below an overlapping power detect level.

In Example 39, the subject matter of any one or more of Examples 27-38 optionally include ax station.

Example 40 is a non-transitory computer-readable storage medium that stores instructions for execution by one or more processors, the instructions to configure the one or more processors to cause an apparatus of an access point to: encode a physical layer convergence procedure (PLCP) protocol data unit (PPDU) including a basic service set identifier of the access point; encode the PPDU to indicate spatial reuse (SR) delay, SR restricted, or SR not permitted; and configure the access point to transmit the PPDU.

In Example 41, the subject matter of Example 40 optionally includes where the instructions further configure the one or more processors to cause the apparatus of the access point to: if the PPDU is a high efficiency (HE) single-user (SU) PPDU or a HE extended range SU PPDU, encode the PPDU to indicate SR delay, and encode the PPDU to comprise a trigger frame.

In Example 42, the subject matter of Example 41 optionally includes if the PPDU is a high efficiency (HE) multi-user (MU) PPDU, encode the PPDU to indicate SR restricted, and encode the PPDU to comprise a trigger frame.

In Example 43, the subject matter of any one or more of Examples 40-42 optionally include ax station.

Example 44 is a method performed by an apparatus of an access point, the method including: encoding a physical layer convergence procedure (PLCP) protocol data unit (PPDU) including a basic service set identifier of the access point; encoding the PPDU to indicate spatial reuse (SR) delay, SR restricted, or SR not permitted; and configuring the access point to transmit the PPDU.

In Example 45, the subject matter of Example 44 optionally includes the method further including: if the PPDU is a high efficiency (HE) single-user (SU) PPDU or a HE extended range SU PPDU, encoding the PPDU to indicate SR delay, and encoding the PPDU to comprise a trigger frame.

In Example 46, the subject matter of any one or more of Examples 44-45 optionally include if the PPDU is a high efficiency (HE) multi-user (MU) PPDU, encode the PPDU to indicate SR restricted, and encoding the PPDU to comprise a trigger frame.

In Example 47, the subject matter of any one or more of Examples 44-46 optionally include ax station.

Example 48 is an apparatus of an access point, the apparatus including: means for encoding a physical layer convergence procedure (PLCP) protocol data unit (PPDU) including a basic service set identifier of the access point; means for encoding the PPDU to indicate spatial reuse (SR) delay, SR restricted, or SR not permitted; and means for configuring the access point to transmit the PPDU.

In Example 49, the subject matter of Example 48 optionally includes the apparatus further including: if the PPDU is a high efficiency (HE) single-user (SU) PPDU or a HE extended range SU PPDU, means for encoding the PPDU to indicate SR delay, and means for encoding the PPDU to comprise a trigger frame.

In Example 50, the subject matter of any one or more of Examples 48-49 optionally include if the PPDU is a high efficiency (HE) multi-user (MU) PPDU, means for encode the PPDU to indicate SR restricted, and means for encoding the PPDU to comprise a trigger frame.

In Example 51, the subject matter of any one or more of Examples 44-50 optionally include ax station.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station, the apparatus comprising: a memory; and
   processing circuitry coupled to the memory, wherein the processing circuitry is configured to:
   decode a first portion of a physical layer convergence procedure (PLCP) protocol data unit (PPDU); and
   if the PPDU is an overlapping basic service set (OBSS) PPDU, and a receive power of the PPDU is below an overlapping power detect level, configure the station to transmit a frame.

2. The apparatus of claim 1, wherein the processing circuitry is further configured to:
   if the PPDU is not a non-high throughput (non-HT) frame comprising a public access frame with a receiver address field equal to a media access control (MAC) address of the station, if the PPDU is not a non-HT with a group address and the public access frame, if the PPDU is the OBSS PPDU, and if the receive power of the PPDU is below the overlapping power detect level, configure the station to transmit the frame.

3. The apparatus of claim 2, wherein the processing circuitry is further configured to:
   if the PPDU is a high efficiency (HE) multi-user (MU) PPDU and a spatial reuse field of a HE signal A (HE-SIG-A) field of the PPDU indicates spatial reuse (SR) restricted, configure the station to transmit the frame during a reception of a remaining portion of the PPDU.

4. The apparatus of claim 3, wherein the PPDU comprises a trigger frame.

5. The apparatus of claim 3, wherein the spatial reuse field indicates SR restricted by a value of the spatial reuse field, wherein the spatial reuse field is 2 or more bits.

6. The apparatus of claim 2, wherein the processing circuitry is further configure to:
   if the PPDU is a high efficiency (HE) single-user (SU) PPDU or an HE extended range SU PPDU, and if a spatial reuse (SR) field of a HE signal A (HE-SIG-A) field of the PPDU indicates SR delay, configure the station to transmit the frame after receiving the PPDU.

7. The apparatus of claim 6, wherein the PPDU comprises a trigger frame, and wherein the spatial reuse field indicates SR delay by a value of the spatial reuse field, wherein the spatial reuse field is 2 or more bits.

8. The apparatus of claim 6, wherein the station is configured to transmit the frame after the duration of the PPDU plus a delay time, wherein the delay time is one from the following group: an arbitration inter-frame space (AIFS), an extended inter-frame space (EIFS), a distributed channel access function (DCF) inter-frame space (DIFS), a point coordination function (PCF) inter-frame space (PIFS), or a short inter-frame space (SIFS).

9. The apparatus of claim 2, wherein the processing circuitry is further configure to:
   if the PPDU is a high efficiency (HE) PPDU, and a spatial reuse (SR) field indicates SR disallowed, configure the station to defer before transmitting the frame for a duration of the PPDU and a network allocation vector (NAV) duration indicated by the PPDU.

10. The apparatus of claim 2, wherein the processing circuitry is further configure to:
    if the PPDU is a high efficiency (HE) PPDU, and a spatial reuse (SR) field indicates SR allowed, configure the station to begin to transmit the frame during a duration of the PPDU.

11. The apparatus of claim 1, wherein the processing circuitry is further configured to:
    if the PPDU is not a non-high throughput (non-HT) frame comprising a public access frame with a receiver address field equal to a media access control (MAC) address of the station, the PPDU is not a non-HT with a group address and the public access frame, the PPDU is the OBSS PPDU, and the receive power of the PPDU is below the overlapping power detect level, refrain from setting a network allocation vector (NAV) based on a NAV duration of a trigger frame, wherein the PPDU further comprises the trigger frame.

12. The apparatus of claim 1, wherein the processing circuitry is further configured to:
    raise the overlapping power detect level and lower a transmit power for the frame, or lower the overlapping power detect level and raise the transmit power for the frame.

13. The apparatus of claim 1, wherein the processing circuitry is further configured to:
    if the PPDU is the OBSS PPDU, and a receive power of the PPDU is below an overlapping power detect level, configure the station to transmit the frame, unless the PPDU indicates not to use spatial reuse.

14. The apparatus of claim 1, wherein the station is one from the following group: an Institute of Electrical and Electronic Engineers (IEEE) 802.11ax access point, an IEEE 802.11 station, an IEEE access point, a station acting as a group owner (GO), IEEE 802.11az station, IEEE 802.11az access point, and an IEEE 802.11ax station.

15. The apparatus of claim 1, further comprising transceiver circuitry coupled to the memory; and, one or more antennas coupled to the transceiver circuitry.

16. A non-transitory computer-readable storage medium that stores instructions for execution by one or more processors, the instructions to configure the one or more processors to cause an apparatus of a station to:
    decode a first portion of a physical layer convergence procedure (PLCP) protocol data unit (PPDU); and
    if the PPDU is an overlapping basic service set (OBSS) PPDU, and a receive power of the PPDU is below an overlapping power detect level, configure the station to transmit a frame.

17. The non-transitory computer-readable storage medium of claim 16, wherein the instructions further configure the one or more processors to cause the apparatus of station to:
    configure the station to transmit the frame, if the PPDU is not a non-high throughput (non-HT) frame comprising a public access frame with a receiver address field equal to a media access control (MAC) address of the station, the PPDU is not a non-HT with a group address and the public access frame, the PPDU is the OBSS PPDU, and the receive power of the PPDU is below the overlapping power detect level.

18. The non-transitory computer-readable storage medium of claim 17, wherein the instructions further configure the one or more processors to cause the apparatus of station to:
    configure the station to transmit the frame within a duration of the PPDU, if the PPDU is a high efficiency (HE) multi-user (MU) PPDU and a spatial reuse field of a HE signal A (HE-SIG-A) field of the PPDU indicates spatial reuse (SR) restricted.

19. A method performed by an apparatus of a station, the method comprising:
    decoding a first portion of a physical layer convergence procedure (PLCP) protocol data unit (PPDU); and
    configuring the station to transmit a frame, if the PPDU is an overlapping basic service set (OBSS) PPDU, and a receive power of the PPDU is below an overlapping power detect level.

20. The method of claim 19, the method further comprising:
    configuring the station to transmit the frame, if the PPDU is not a non-high throughput (non-HT) frame comprising a public access frame with a receiver address field equal to a media access control (MAC) address of the station, the PPDU is not a non-HT with a group address and the public access frame, the PPDU is the OBSS PPDU, and the receive power of the PPDU is below the overlapping power detect level.

21. An apparatus of an access point comprising: a memory; and processing circuitry couple to the memory, wherein the processing circuitry is configured to:
    encode a physical layer convergence procedure (PLCP) protocol data unit (PPDU) comprising a basic service set identifier of the access point;
    encode the PPDU to indicate spatial reuse (SR) delay, SR restricted, or SR not permitted;
    if the PPDU is a high efficiency (HE) multi-user (MU) PPDU, encode the PPDU to indicate SR restricted, and encode the PPDU to comprise a trigger frame; and
    configure the access point to transmit the PPDU.

22. The apparatus of claim 21, wherein the processing circuitry is configured to:
    if the PPDU is a high efficiency (HE) single-user (SU) PPDU or a HE extended range SU PPDU, encode the PPDU to indicate SR delay, and encode the PPDU to comprise a trigger frame.

23. The apparatus of claim 20, wherein the access point is one from the following group: an Institute of Electrical and Electronic Engineers (IEEE) 802.11ax access point, an IEEE 802.11 station, an IEEE access point, a station acting as a group owner (GO), and an IEEE 802.11ax station.

24. The apparatus of claim 20, further comprising transceiver circuitry coupled to the memory; and, one or more antennas coupled to the transceiver circuitry.

* * * * *